Oct. 10, 1933.  L. O. BUIST  1,929,770

DEVICE FOR MANUFACTURING LIQUID CONTAINERS

Original Filed June 24, 1929  5 Sheets-Sheet 2

Oct. 10, 1933. L. O. BUIST 1,929,770
DEVICE FOR MANUFACTURING LIQUID CONTAINERS
Original Filed June 24, 1929 5 Sheets-Sheet 3

INVENTOR
L. O. Buist
BY
E. J. Fetherstonhaugh
ATTORNEY

Oct. 10, 1933.   L. O. BUIST   1,929,770
DEVICE FOR MANUFACTURING LIQUID CONTAINERS
Original Filed June 24, 1929   5 Sheets-Sheet 5

Patented Oct. 10, 1933

1,929,770

UNITED STATES PATENT OFFICE 1,929,770

DEVICE FOR MANUFACTURING LIQUID CONTAINERS

Lyman Ormiston Buist, Toronto, Ontario, Canada

Application June 24, 1929, Serial No. 373,436
Renewed October 3, 1932

9 Claims. (Cl. 93—39)

This invention relates to a device for manufacturing liquid containers, as described in the present specification and illustrated in the accompanying drawings which form part of same.

The invention consists of novel mechanisms and a combination thereof adapted to perform automatically the necessary operations in forming and completing a liquid container, and preferably although not necessarily, one formed of a fibrous or cardboard material, as pointed out broadly and specifically in the claims for novelty following a description containing an explanation in detail of an acceptable form of the invention.

The objects of the invention are to construct a machine capable of forming and completing a liquid container by means of a series of automatically performed operations, thereby greatly reducing the labour charges involved and producing an efficient economical container; to prevent contamination in the manufacture of a container for food stuffs and particularly milk or cream, by effecting the forming and completing of the container throughout by machinery without necessitating the handling by the operators of the containers during the operation; to completely form, finish and convey the containers for milk or other food stuffs, to a filling station without once handling the container; and generally, to provide a machine capable of accomplishing the aforesaid results and purposes and of manufacturing efficiently and at a reduced cost, containers for food stuffs and particularly containers as described in my application for patent in the United States of America, Serial No. 350,748, filed March 28, 1929.

In the drawings.

Like numerals of reference indicate corresponding parts in the various figures.

Referring to the drawings, the numeral 10 indicates a plate forming the main platform of the machine and which supports the various mechanisms involved. The platform 10 is supported on suitable uprights or legs, as indicated at 11.

12 is the main driving shaft and is in turn driven by the usual source of power either direct from a motor or from a line shaft. The shaft 12 is journalled in the bearings indicated at 13 rigidly secured to the platform 10. A revolving turret 15 having four similar arms 16 situated at right angles to each other and in the same plane, is rotatably mounted on the upper side of the plate 10 and in such a manner that there will be a clearance between the arms 16 and said plate 10. A gear 17 is rotatably mounted in the axis of the turret 15 and beneath the turret 15 meshes with the quadrant gear 18 rotatably mounted on the plate 10. An arm 19 rigidly secured to the gear 18 extends outwardly therefrom and is pivotally connected at its outer end by a connecting rod 20 to a rocking arm 21. The rocking arm 21 is pivotally mounted to the plate 10 as at 21a and depends downwardly therefrom and has a roller 22 journalled thereon and engaging a cam 23 secured on the shaft 12. A tension spring 24 is connected to the arm 19 and the plate 10 and is adapted to normally retain the gears 17 and 18 in their initial position when not acted upon by the cam 23. The gear 17 is actuated through substantially a quarter of a revolution by the action of the cam 23 on the lever 21 and the arm 19. The gear 17 acts on a clutch mechanism to rotate the turret 15 through 90 degrees for each oscillation of the lever 21.

Figures 9, 10, 11, 12, 13:
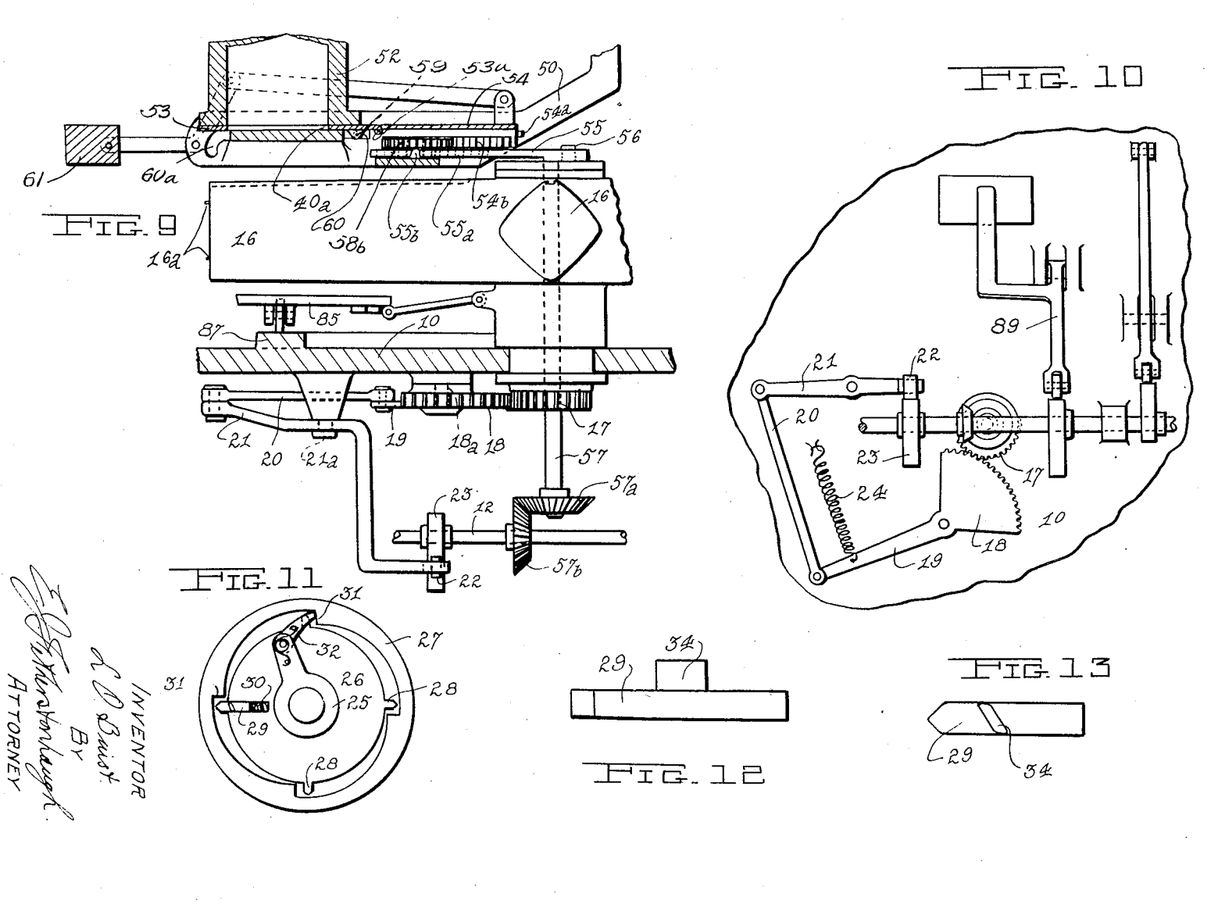
Figure 9 is a part sectional and part elevational view showing the container bottom feeding mechanism.
Figure 10 is a fragmentary bottom plan view of Figure 2.
Figure 11 is a detail view showing part of the turret rotating means.
Figure 12 is an elevational view showing a detail of Figure 11.
Figure 13 is a plan view of Figure 12.

In Figures 11, 12 and 13, I show an efficient clutch mechanism which is operated in conjunction with the gear 17 for the partial rotation of the turret 15. In this mechanism, 25 indicates a sleeve rotatably mounted in respect to the plate 10 and the turret 15 and in the axis of said turret. The sleeve 25 is rotatably mounted in a sleeve 26 rigidly secured to the plate 10. A sleeve 27 is rigidly secured to the turret 15 and is rotatably mounted on and encircles the upper portion of the sleeve 26.

Four recesses 28 are formed on the inner periphery of the sleeve 27 and are spaced equally one from the other. A bolt 29 is reciprocally mounted on the sleeve 26 and has a spring 30 impinging against it and adapted to hold said bolt 29 in one of the recesses 28 to prevent rotation of the sleeve 27 and the turret 15 secured thereto. The sleeve 27 is also formed with four ratchet teeth 31 situated above the recesses 28. A ratchet pawl 32 is pivotally mounted on an arm 33 formed on the sleeve 25 and is normally springheld in engagement with one of the teeth 31. An extension 34 is formed on the upper side of the bolt 29 and is so positioned that on the reverse rotation of the sleeve 25, by virtue of the spring 24 acting on the arm 19, the pawl 31 will pass on the inner side of said extension, but on the forward rotation of the sleeve 25, as indicated by the arrow, the pawl 31 will engage said extension 34 to withdraw the bolt 27 from the recess 28 immediately before engaging the adjacent ratchet tooth 31. As the sleeve 25 rotates further, the sleeve 27 is also carried with it and the turret is then rotated through an angle of 90 degrees when the bolt 29 engages the next recess 28 to retain the turret 15 stationary until the next forward oscillation of the sleeve 25.

Figures 14, 15, 16:
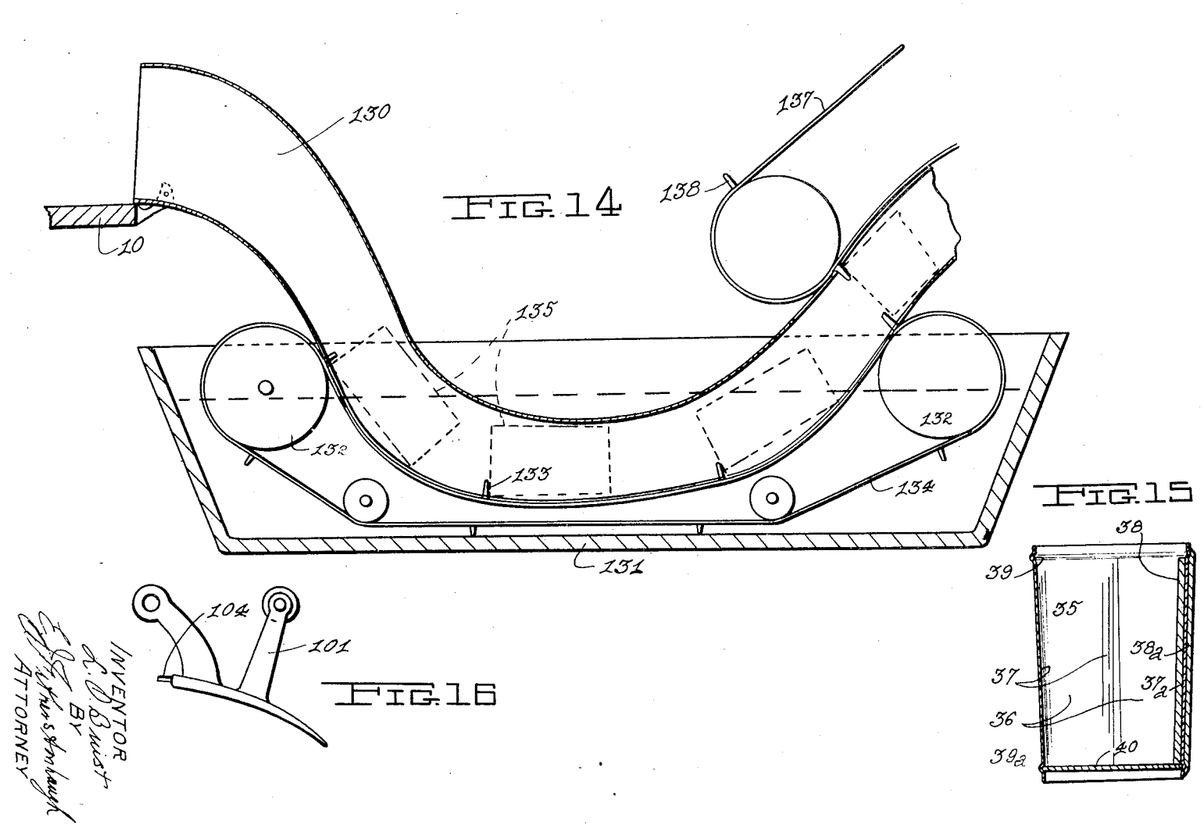
Figure 14 is a sectional view showing a mechanism for coating the finished containers with paraffin.
Figure 15 is a sectional view of a container as manufactured by this machine.
Figure 16 is a detail view of part of the forming mechanism.

As there are four main positions in which the main forming operations of the container are completed, the turret 15 has the four mandrels 16 formed thereon and at right angles to each other. The container 35 itself, as illustrated in Figure 15, is substantially rectangular in cross section, having the slightly curved sides 36, three rounded corners 37 and the fourth corner 37a bevelled.

The sides 36 are preferably formed from a semi-rigid sheet such as cardboard. The ends of the sheet overlap each other at the fourth corner 37a and are clamped together between an inner wooden strip 38 and an outer wooden strip 38a secured together by suitable nails. The blank sheet before being formed into the sides of the container is crimped adjacent the top and the bottom as at 39 and 39a, respectively. The crimp 39a forms a groove in which the bottom plate 40 is positioned and the upper crimp 39 forms a groove into which an upper cover plate or lid may be positioned after the container is formed. The mandrels 16 are formed to conform with the shape of the container and are tapered slightly throughout their length to facilitate the removal of the formed container therefrom.

It is to be noted here however, that I do not limit myself to a form of construction of my mandrels 16 whereby only a substantially rectangular container could be formed as by a very slight change in the form of the mandrels 16 and in the forming mechanism, I would be enabled to produce containers of another shape, such as triangular, cylindrical, or one having several sides.

Figure 7:
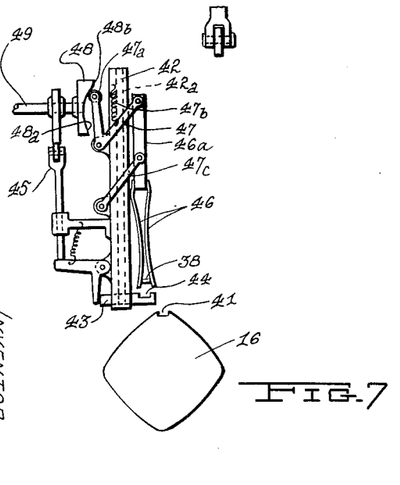
Figure 7 is a side elevational view of the material feeding mechanism.

The first main operation in the construction of the container is the placing of the inner wooden strip 38. On the upper side of each mandrel 16 a longitudinal groove 41 is formed. At the first position of the turret 15, the wooden strip 38 is placed in said groove 41. In Figure 7 is shown a mechanism capable of accomplishing this. In this device 42 is a vertical framework forming a magazine for carrying the wooden strips 38. The strips 38 are stored one on top of the other in a recessed portion 42a formed in the frame 42.

A plate 43 is reciprocally mounted at the bottom of the magazine 40 and is adapted to reciprocate laterally in regards to the recessed portion 42a.

A groove 44 is formed on the upper face of the plate 43 and is of sufficient depth to accommodate one wooden strip 38. A cam and rocker arm mechanism as illustrated at 45, serves to reciprocate the plate 43 relative to the magazine recess 42a so as to carry the groove 44 from a position directly under the recess 42a to a position clear therefrom. The magazine 42 is arranged in parallel alignment with the mandrel 16 at its starting position and is positioned slightly to one side and above said mandrel. On each reciprocation of the plate 43, a wooden strip 38 is removed from the recess 41 by the grooved portion 44. Two or more pairs of resilient fingers 46 are secured to the plate 46a and depend therefrom. A bell crank 47 is pivotally secured to the frame 42 and is pivotally connected at one end to the plate 46a and has a roller 47a engaging a cam 48 mounted on a shaft 49. A second arm 47c is pivotally connected at one end to the plate 46a and at the other to the frame 42 and is in parallel arrangement with the one arm of the bell crank 47 so as to retain the plate 46a in the same relative angular position with the horizontal. The cam 48 has two lifts 48a and 48b acting on the roller 47a. The cam lift 48a is sufficient to impell the plate 46a and the resilient fingers 46 downwardly so as to grip the wooden strip 38 carried in the groove 44. A spring 47b acts on the arm 47 to normally lift the plate 46a so that after the roller 47a becomes disengaged from the cam portion 48a, the strip 38 is lifted out of the groove 44 and the plate 43 is reciprocated back to the original starting point. The cam portion 48b now acts on the roller 47a and lifts it a sufficient distance to force the plate 46a and the resilient fingers 46 downwardly and into engagement with the upper portion of the slanting sides of the mandrel 16.

The fingers 46 are forced apart by said slanting sides and the wooden strip 38 carried therebetween is deposited in the groove 41 formed in said mandrel.

The arbor 15 is now rotated through 90 degrees by the mechanism described above and the next operation takes place. This consists of placing the bottom plate 40 of the container on the end of the mandrel 16 and releasably securing same thereon. A super-structure 50 is secured to a framework 51 secured to and positioned above the plate 10. The structure 50 is positioned above the mandrel 16 at this stage. A magazine 52 carrying the bottoms 40 is mounted on the structure 50. A plate 53 of substantially the same thickness as the bottom 40 is reciprocally mounted under the magazine 52 and has an opening 40a formed therethrough conforming in shape and size with the bottoms 40. The plate 53 is hinged as at 53a to a plate 54 reciprocally mounted in grooves 54a formed in the structure 50. 55 is a bar having rack teeth 55a cut on one side thereof and is pivotally mounted to a crank 56 formed on a rotating shaft 57 rotatably mounted in the axis of the arbor 15.

The shaft 57 has a gear 57a secured thereon at its lower end and meshing with a gear 57b rigidly secured on the main driving shaft 12.

The rack teeth 55a mesh with a gear 58 rotatably mounted on a spur 58a secured to the structure 50. A gear 58b rigid with the gear 58 and in the axis thereof meshes with a rack 54b formed on the plate 54. A lug 55b formed on the structure 50 bears against the back of the bar 55 and retains the rack 55a in mesh with the gear 58. As the bar is drawn back and forth by the crank 56, the plate 54 is reciprocated by the gear 58a meshing with the rack 54b formed thereon.

Extensions 59 are formed on the plate 53 at either side and are reciprocally mounted in grooves 60 formed in the structure 50. The grooves 60 curve downwardly at a point adjacent the outer extremity of the mandrel 16 as at 60a. As the plate 54 is reciprocated back and forth, the plate 53 is likewise reciprocated at the innermost position of the plate 53. The opening 40a is directly beneath the magazine 52 and one bottom plate 40 is deposited therein. On the outward travel of the plate 53, said bottom plate 40 is carried outwardly. Adjacent the end of the outward reciprocation, the extensions 59 following the grooves 60 are carried downwardly at 60a a sufficient distance to bring the plates 53 to the end of the mandrel 16. Small dowel pins 16a are formed on the end of the mandrels 16. As the bottom 40 is brought directly over the end of the mandrel 16, a small trip hammer 61 pivotally mounted on the frame 50 and operated by the outward movement of the bar 55 through a link 55a is adapted to swing downwardly and force the bottom 40 out of the opening 40a and onto the dowels 16a. The hammer 61 is then raised by the bar 55 at the same time as the plate 53 is brought back to its initial point by the return reciprocation thereof.

The mandrel 16 is now ready to be carried on by a rotation through 90° of the arbor 15. The next operation consists of bringing the blank sheet forming the container sides into the proper position relative to the mandrel 16 to form the sides 36 of the container.

Figures 2, 3:
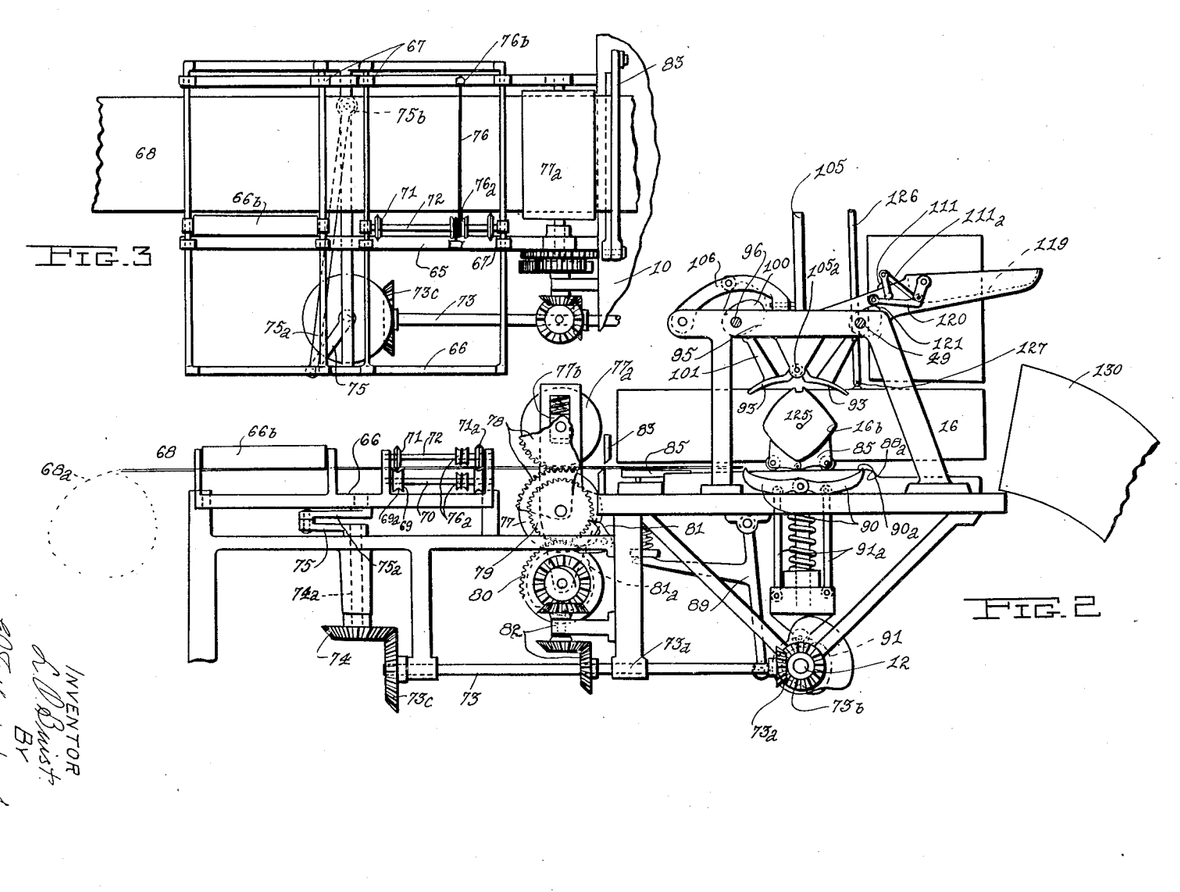
Figure 2 is a side elevational view of the device.
Figures 3 and 4 are fragmentary plan views of Figure 2.

I have found that the most economical method of preparing and forming the blank sheet is to form the crimps 39 and 39a before positioning the sheet on the mandrel 16. A device for accomplishing this is best shown in Figures 2 and 3. The numeral 65 indicates a suitable framework fixed in relation to the plate 10 and extending outwardly therefrom. A frame 66 is reciprocally mounted on the frame 65 as at 67.

The paper stock is indicated by the numeral 68. The paper is preferably led directly to the machine from the roll indicated at 68a. A pair of rolls 69 having a centrally located peripheral groove 69a are mounted on a shaft 70 journalled in the frame 66. The rolls 69 are positioned beneath the paper stock 68 and are adapted to bear against said stock. The two rolls 69 are spaced one from the other the proper distance according to the distance between the crimps 39 and 39a that are to be formed. A second pair of rollers 71 corresponding to the rollers 69 are mounted on the shaft 72 journalled in the frame 66 and are adapted to pass across the top of the paper and are situated directly above the rolls 69. The rolls 71 have the peripheral ridge 71a adapted to force the paper stock into the groove 69a as the rolls 71 and 69 pass across the paper on the reciprocation of the frame 66. In order to reciprocate the frame 66 in a transverse direction in relation to the paper stock 68, a shaft 73 journalled as at 73d in the frame of the machine has a gear 73a at one end meshing with a gear 73b mounted on the shaft 12 and has a gear 73c at the other end engaging a gear 74 mounted on a vertical shaft 74a. On the upper end of the shaft 74a is a crank 75. The crank 75 is connected by the pivoted connecting rod 75a to the reciprocating frame 66 as at 75b and thus for each half rotation of the crank 75, the frame 66 will reciprocate once in a transverse direction in relation to the paper stock 68 and the crimping rolls 71 and 69 will pass once across the paper forming the crimps 39 and 39a. A printing device as indicated by the numeral 66b, may be mounted on the reciprocally mounted frame 66 and adapted to print advertising matter on the paper stock on the reciprocation of the frame 66. As there are any number of well known printing devices that might be utilized to accomplish this purpose, it is not deemed necessary to specify in detail any particular form of printing device.

In order to rotate the rolls 71 and 69 as they are passing across the paper and to prevent undue tension on the paper stock, I wind cables 76 over drums 76a on the respective shafts 72 and 70 and secure the ends of said cables to the frame 65 as at 76b. The next operation is to advance the paper stock to a position for shearing each sheet therefrom. A pair of friction rolls 77 and 77a are suitably journalled in the frame with the roll 77a directly above the roll 77. The roll 77a is resiliently journalled in the frame as at 77b. A pair of gears 78 secured to each roll respectively, mesh with each other and serve to properly rotate the roll 77a on the rotation of the roll 77. A gear 79 rigid with the roll 77 meshes with a quadrant gear 80. There are sufficient teeth on the quadrant gear 80 to rotate the gear 79 sufficiently to draw the paper stock between the rolls a sufficient distance for one sheet at each rotation of the quadrant gear 80.

A ratchet mechanism 81 is adapted to engage the teeth on the gear 79 when the teeth on the quadrant gear 80 are out of mesh with the gear 79. A cam 81a is adapted to lift the ratchet 81 out of engagement with the teeth on the gear 79 when the quadrant gear 80 meshes with the teeth on said gear 79. A suitable gear train 82 serves to rotate the quadrant gear 80 on the rotation of the shaft 73. After the paper stock is advanced by the rotation of the rolls 77 and 77a, a shear 83 is adapted to sever the sheet from the unrolled paper stock. The shear 83 may be operated in any of the usual well known ways such as a cam or lever mechanism co-acting with the rotating drive shaft 12 to raise and lower the shear 83.

Figure 8:
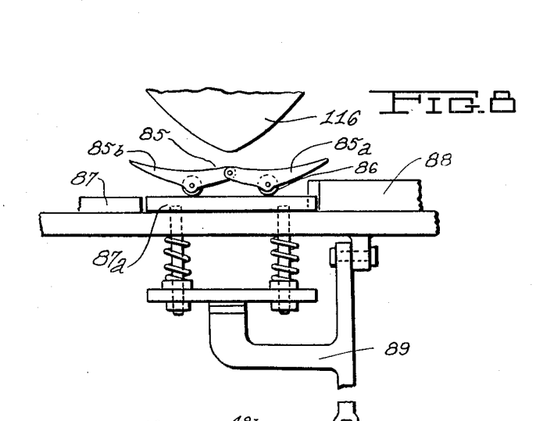
Figure 8 is an elevational view of the track elevating mechanism.

After the sheet is sheared from the paper stock 68 it is in the proper position for being carried into engagement with the mandrel 16. A car 85 having the folding leaves 85a and 85b is pivotally secured under each mandrel 16. Under each of the folding leaves 85a and 85b, a roller 86 is rotatably mounted. The rollers 86 bear on a circular track 87. A portion of the track 87 is raised as at 88. Before the sheet of paper is positioned under the mandrel 16, the car 85 is positioned some distance below the mandrel 16 to allow for the insertion of the paper sheet under said mandrel. After the sheet of paper stock is placed under the mandrel, the truck 85 is elevated by elevating the track section 87a. The elevated track section 87a at its initial position is on the same level as the lowest portion of the track 87. A cam and rocker arm mechanism 89 actuated by the rotation of the shaft 12 serves to elevate the track section 87a at the proper time. As the track section 87a is elevated by the cam and lever mechanism 89, the folding portions of the car 85 engage the sheet of paper and force it into close engagement with the under side of the mandrel 16 and at the same time fold it along either of the under sides of said mandrel. The track section 87a elevates the car 85 a sufficient distance to allow it to pass onto the raised portion of the track 88 on further rotation of the arbor 15. The arbor 15 is now rotated to the next stationary position where the final shaping and clamping operations are performed on the container.

Clamping jaws 90 are brought into engagement with the under side of the mandrel 16 by the action of the cam 91 on the lifting toggles 91a connected to said jaws 90. As the jaws 90 are raised they bring the paper sheet into close engagement with the undersides of the mandrel. On the other ends of the jaws 90 a curved portion 90a serves to bend the paper around the two side corners 16b of the mandrel 16. A pair of curved plates 93 are pivotally mounted above the mandrel at 105a above this point on the frame 95 rigidly secured to the plate 10 and extending upwardly therefrom.

Figure 1:
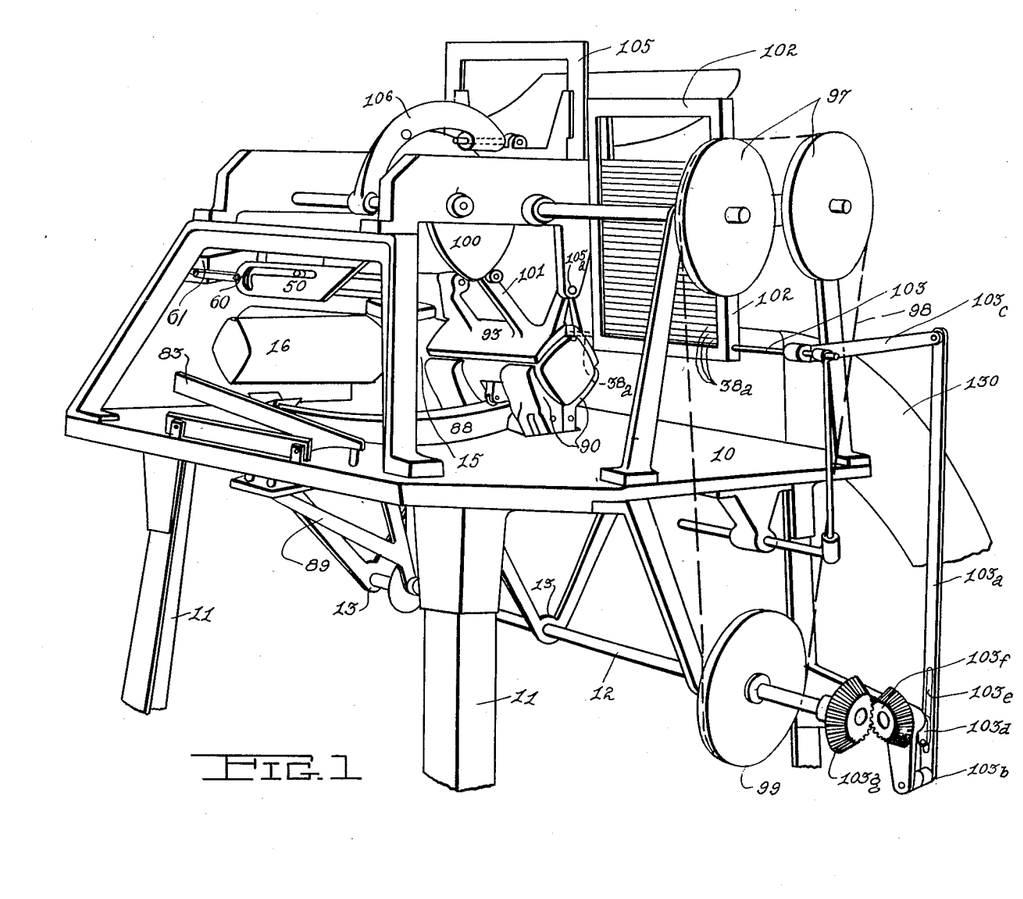
Figure 1 is a fragmentary perspective view illustrating part of the device.

A shaft 96 and the shaft 49 are journalled in the frame 95. The shafts 96 and 49 are suitably driven by sprocket wheels 97 respectively, secured thereon and connected by the sprocket chain 98 to the sprocket gear 99 rigidly secured on the shaft 12. Cams 100 mounted on the shafts 96 and 49 engage extensions 101 on the plates 93 and force said plates downwardly and against the mandrel 16 at the proper time. The plates 93 are forced downwardly into the last named position after the paper sheet has been properly bent by the jaws 90, as stated above. The container is now sufficiently formed to position the outer wooden strip 38a thereon for nailing to the inner strip 38. A magazine 102 is positioned in line with the mandrel 16 at this point and adjacent its outer end. The strips 38a are stored one above the other in the magazine 102, as best shown in Figure 1. A plunger 103 reciprocally mounted at the bottom of the magazine 102 is adapted to engage the bottom strip 38a in said magazine and force same out of the magazine 102 and between the adjacent edges of the plates 93 directly above the folded ends of the sheet of paper.

Resilient clips 104 are formed on adjacent edges of the plates 93 and are adapted to bear on the upper edge of the strip 38a after it is forced into its final position between said plates 93.

The plunger bar 103 is reciprocated by an oscillating arm 103a pivotally connected at its lower end to the frame as at 103b and pivotally connected at its upper end to said bar 103 by the pivoted connecting rod 103c. A crank 103d is pivotally and reciprocally connected to the arm 103a in the slot 103e. The crank 103d is actuated by the gear 103f rigid therewith and meshing with the gear 103g fixed on the rotating drive shaft 12.

The strip 38a is now nailed to the strip 38. The mechanism for accomplishing this is best shown in Figures 2, 4, 5, and 6. 105 is a vertical trackway or guide pivotally connected at its lower end to the frame 95 as at 105a. A hammer 107 is reciprocally mounted in the vertical trackway 105. A cam and lever mechanism 106 operated by the rotation of the shaft 96 serves to lift and drop the hammer 107. As the hammer is lifted, the track 105 is pivoted slightly away from the mechanism 106. As it is swung to its extreme position distant from said mechanism, a plurality of magnets 107a mounted in the hammer 106 each lift a nail from a respective nail groove 108 and position it for driving into the strip 38a and the strip 38. As the cam lever mechanism 106 is actuated further, the hammer is released and it drops following the trackway 105. As the trackway 105 is mounted directly above the space between adjacent edges of the plate 93, the nails are driven into the wooden strip 38a and the strip 38 and may be clinched if necessary on the inner side of the strip 38 as they come in contact with the mandrel 16.

Figures 4, 5, 6:
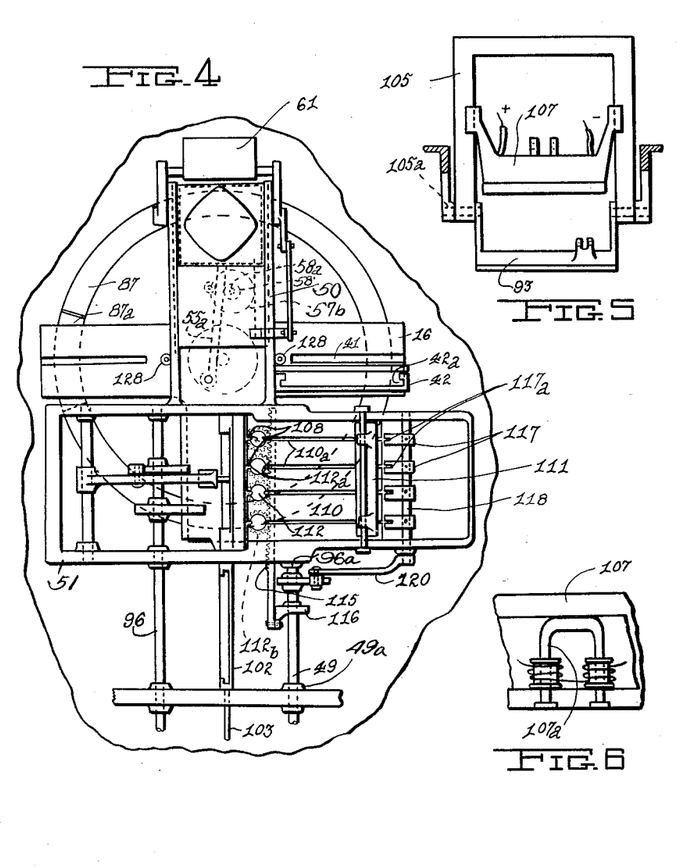
Figure 5 is a fragmentary elevational view of the nailing mechanism.
Figure 6 is a fragmentary sectional view of Figure 5.

In order to ensure only one nail being picked up at a time by each respective magnet 107, I have a slanting table 110 with grooves 110a formed therein, each groove being of a sufficient depth to accommodate nails and to support them by the heads of said nails engaging the upper edges of the grooves. An agitating mechanism consisting of a plate 111 rubbing over the heads of the nails adjacent the upper end of the slanting table 110, serves to force the nails downwardly along the slanting table. At the lower end of the slanting table 110, I have vertical spindles 112 pivotally mounted, there being one spindle 112 for each of the nail grooves 110a. On the periphery of each spindle are two recesses 112a situated diametrically opposite each other. Each recess 112a is of sufficient size to accommodate one nail therein. A reciprocating rack 115 reciprocated by the action of a cam 116 mounted on the shaft 49 meshes with gears 112b adjacent the lower end of the spindles 112. As the rack 115 is reciprocated back and forth, each spindle 112 is rotated back and forth through a half revolution and one nail at a time is carried from the grooves 110a to a position at the recesses 108 where they may be picked up by the magnets 107a. Oscillating arms 117 having slots 117a at one end are secured at the other end to a shaft 118. The shaft 118 is journalled in the sides of a receptacle 119 adapted to carry the nails and positioned at the upper end of the slanting table 110. The shaft 118 is oscillated by the oscillating arm 120 acted upon by the cam 121 mounted on the shaft 49. As the arms 117 oscillate, nails are picked up in the slots 117a and carried to a feeding position for the grooves 110a.

The plate 111 is actuated by an oscillating arm 111a pivotally connected to the oscillating arm 120. The plate 111 as it reciprocates on the table 110 carries the nails from the slots 117a into the grooves 110. After the nailing operation is completed, the container is now ready to be removed from the mandrel to have a final coat of paraffin on all its surfaces.

The turret 15 is again rotated through an angle of 90°. The raised track portion 88 terminates a short distance from the final stationary position of the mandrel 16 and the car 85 is now released from the mandrel 16 and takes its original position on the track portion 87. Approximately half way through this movement of the arbor 15, the container is removed from the mandrel 16. One very effective method of removing the container from the mandrel is to direct a blast of air through an opening 125 formed through the end mandrel 16. The blast of air through said opening blows the container from the mandrel 16. In order to provide this blast of air at the proper time, I have a pipe 126 mounted on the frame 95 and situated about half way between the last named position of the mandrel and the first named position of said mandrel. The pipe 126 has a valve 127 at its lower end and is connected at the other end to a source of air under pressure. Openings 128 are formed in each of the mandrels 16 and adjacent their inner ends said bosses being adapted to engage and open the valve 127 at predetermined times and thereby deliver a blast of air through the openings provided in the bosses and into the mandrel 16. The openings 128 lead to the openings 125 and as they make contact with the pipes 126 the blast of air from said pipes serves to remove the container from the mandrel 16.

The formed container after being removed from the mandrel 16 falls into an adjacent chute 130 and is conveyed thereby to the immersing and coating device. This device is best shown in Figure 15. The chute 130 is fixed in relation to the plate 10 and leads to a vat or trough 131. An endless conveyer belt or chain 134 is lead over suitably rotated driving pulleys 132 situated beneath the chute 130. Suitable cleats 133 are mounted at intervals on the conveyer belt 134 and are adapted to project upwardly above the floor of the chute 130 and engage the containers as indicated in dotted lines at 135. The chute 130 leads downwardly and beneath the surface of a coating liquid such as hot paraffin contained in the trough 131. From this point, the chute 130 leads upwardly and out of the trough where a second conveyer belt 137 having cleats 138 formed thereon engages the containers and conveys same to the final stage where the containers are ready for use. The conveyer belt 137 is preferably mounted above the chute 130 to prevent excess coating liquid that may adhere to the containers from being carried by said belt 137 away from the trough 131.

This device in operation provides a very efficient mechanism for forming and completing a container for liquids and the like. The operations are purely mechanical and the container is not handled once throughout by the operator. The inside wooden strips 38 are first inserted into the grooves 41. The mandrels 16 are then carried to another position where the container bottoms 40 are releasably secured to the end of the mandrel 16 and the mandrel is then carried to a point for receiving the sheet forming the container sides.

After said sheet is positioned, it is releasably secured to the mandrel 16 by the folding car 85. The mandrel is then moved to a final position where folding plates 90 and 93 fold the sheet about the mandrel 16 and incidentally the container bottom 40. The outer wooden strip 38a is now rammed into place over the lapped ends of the folded sheet and securely nailed by the nail carrying hammer 107. The mandrel is now ready to be moved back to its initial starting point and the truck 85 released and the container is removed from the mandrel 16 while said mandrel is midway in its travel from the final to the starting position. The container falls onto the chute 130 and is conveyed by the endless conveyer 134 through a coating liquid and from thence it is carried by the conveyer 137 to a point where it may be used.

What I claim is:

1. In a machine of the kind described, means for moving a blank crimped at each end beneath a mold having a groove, means for bending the blank around the mold, means for reinforcing and joining the blank edges together from the inner and outer sides thereof, means for forming an end wall in the crimped portion of the blank, and means for releasing the blank in its container form from the mold.

2. In a machine of the kind described, a hollow mold having a groove adapted to support a strip, means for moving a blank beneath the mold and means for bending the blank therearound and to bring the edges of the blank over the strip, means for placing a corresponding strip on the other side of the blank edges in alignment with the mold strip and means for nailing the two strips and securing the blank edges thereby, an end wall adapted to be inserted at one end of the blank, and means for releasing the blank in its container form by pressure exerted through the hollow mold.

3. In a device for forming and completing a liquid container, a turret having a plurality of outwardly extending arms or forms shaped to conform with the desired shape of the finished container, means for positioning wooden stiffeners for said containers on said arms, means for placing blank sheets forming the bottoms of said containers on the ends of said arms, means for wrapping a sheet forming the sides of said container around said bottoms and overlapping at said wooden stiffeners, means for placing a wooden strip over said overlapped portion and for nailing said strip to said first named stiffener or strip and means for removing said formed containers from said forms or arms.

4. In a device for forming and completing a liquid container, a turret having a plurality of outwardly extending arms or forms shaped to conform with the desired shape of the finished container, means for positioning wooden stiffeners for said containers on said arms, means for placing blank sheets forming the bottoms of said containers on the ends of said arms, means for wrapping a sheet forming the sides of said containers around said bottoms and overlapping at said wooden stiffeners, means for placing a wooden strip over said overlapped portion and for nailing said strip to said first named strip, means for removing said formed containers from said forms or arms, means including an oscillating gear working in conjunction with a clutch and ratchet mechanism for revolving said turret through a predetermined angle and for releasably locking said turret against rotation.

5. In a device for forming and completing a liquid container, a base plate, a turret rotatably mounted on said plate, outwardly extending mandrels on said turret forming molds to shape said container, means for positioning wooden stiffeners for said containers on said mandrels, means for placing blank sheets forming the bottoms of said containers on the ends of said mandrels, means for conveying a blank sheet crimped adjacent two edges into engagement with said mandrels and wrapping same around said mandrels and said bottoms and overlapping the ends at said wooden stiffeners, means for placing a wooden strip over said overlapped portion and for nailing said strip to said first named strip, means for removing said formed containers from said forms or arms, means including an oscillating gear working in conjunction with a clutch and ratchet mechanism for revolving said turret through a certain definite angle and for releasably locking said turret against rotation.

6. In a device for forming and completing a liquid container, a base plate, a turret rotatably mounted on said plate, outwardly extending arms on said turret forming molds to shape said container, longitudinal groves on the upper surface of each of said arms; means for conveying wooden strips one at a time from a storage rack and placing same in each of said grooves, means at the ends of said arms for releasably supporting a plate forming the bottom of said containers, means for conveying a blank sheet crimped adjacent two edges into engagement with said forms, a pivotally mounted hinged car under each of said forms, a circular track on said plate adapted to support said cars, means in said tracks for elevating said cars to bring same into engagement with said blank sheet and force same into close engagement with said form, means for wrapping said sheet around said form and said bottom plate and overlapping the ends thereof at said wooden strip, means for positioning a wooden strip over said overlapped portion and for nailing same to said first named strip and a relieved portion in said track to release said car from said sheet after the bending and securing of same by said nailed strips.

7. In a machine for manufacturing liquid containers formed of a blank sheet wrapped around a bottom plate and secured at its ends between wooden strips nailed together, means including an upper and lower co-acting roll journalled on a reciprocating frame and receiving the cardboard stock therebetween for crimping said stock, a pair of resiliently mounted feeding rolls engaging said stock and receiving same therebetween, means for rotating said feeding rolls through a predetermined angle, a mandrel or mold, a shear adapted to sever a crimped sheet from said stock after said sheet is properly positioned under said mandrel, hinged plates carried on wheels bearing on a circular track, means in said track for forcing said plates and said blank sheet into close engagement with said mandrel, means for wrapping said sheet around said mandrel and around a plate forming the bottom for the container and releasably secured on the end of said mandrel, means in said conveying means for so positioning said blank sheet that one of said crimps will be in the same plane as said bottom plate, and means for positioning and securing by nails the ends of said sheet between wooden strips.

8. In a device for manufacturing liquid containers, a plurality of forms or molds mounted on a revolving turret, means for positioning on the ends of said molds a plate forming the bottoms of said containers, means for wrapping a cardboard sheet forming the sides of said container about said molds and said bottoms, means for inserting outside and inside wooden cleats over the overlapped ends of said sheet and means in said machine for nailing said outside wooden strip to said inside strip.

9. In a machine for manufacturing liquid containers formed of a blank sheet wrapped around a bottom plate and secured at its ends between wooden strips nailed together, means for forming a crease in said blank sheet and for severing said sheet from a strip of similar material, a mandrel, means for conveying said sheet to a position under said mandrel, hinged plates carried on wheels bearing on a circular track, means in said track for forcing said plates and said blank sheet into close engagement with said mandrel, means for wrapping said sheet around said mandrel and around a plate forming the bottom for the container and releasably secured on the end of said mandrel, means in said conveying means for so positioning said blank sheet that one of said crimps will be in the same plane as the bottom plate, and means for positioning and securing by nails the ends of said sheet between wooden strips.

LYMAN ORMISTON BUIST.